(12) United States Patent
Callau

(10) Patent No.: US 11,240,302 B1
(45) Date of Patent: Feb. 1, 2022

(54) LIVE MIGRATION OF LOG-BASED CONSISTENCY MECHANISMS FOR DATA STORES

(71) Applicant: Amazon Technologies, Inc., Seattle, WA (US)

(72) Inventor: Carlos Vara Callau, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1068 days.

(21) Appl. No.: 15/184,925

(22) Filed: Jun. 16, 2016

(51) Int. Cl.
*H04L 29/08* (2006.01)
*G06F 3/06* (2006.01)

(52) U.S. Cl.
CPC ........ *H04L 67/1095* (2013.01); *G06F 3/0604* (2013.01); *G06F 3/067* (2013.01); *G06F 3/0647* (2013.01); *H04L 67/1097* (2013.01)

(58) Field of Classification Search
CPC .......... H04L 67/1095; G06F 17/30575; G06F 16/2358
See application file for complete search history.

(56) References Cited

U.S. PATENT DOCUMENTS

| | | | |
|---|---|---|---|
| 6,772,161 B2 | 8/2004 | Mahalingam et al. | |
| 7,178,050 B2 | 2/2007 | Fung et al. | |
| 7,921,179 B1 * | 4/2011 | Zheng | G06F 16/176 709/213 |
| 9,003,144 B1 | 4/2015 | Hayes et al. | |
| 9,021,296 B1 | 4/2015 | Kiselev et al. | |
| 2007/0220059 A1 | 9/2007 | Lu et al. | |
| 2014/0074996 A1 * | 3/2014 | Bortnikov | H04L 41/0816 709/221 |
| 2015/0172412 A1 | 6/2015 | Escriva et al. | |
| 2016/0150060 A1 * | 5/2016 | Meng | H04L 67/10 709/223 |
| 2016/0210195 A1 * | 7/2016 | Sinha | G06F 11/1451 |

* cited by examiner

*Primary Examiner* — Tonia L Dollinger
*Assistant Examiner* — Ishrat Rashid
(74) *Attorney, Agent, or Firm* — Robert C. Kowert; Kowert, Hood, Munyon, Rankin & Goetzel, P.C.

(57) ABSTRACT

Live migration of log-based consistency mechanisms may be implemented for data stores. A log describing changes to replicas of data maintained at different nodes may be implemented in different ways. While the nodes are available for servicing access requests, a migration of consistent maintained between one instance of a log and a different instance of the log may be performed. A change may be committed to the current instance of the log identifying the new instance of the log as describing changes to the log subsequent to the migration. Upon completing migration, the data may be consistently maintained according to the different instance of the log.

20 Claims, 8 Drawing Sheets

LIVE MIGRATION OF LOG-BASED CONSISTENCY MECHANISMS FOR DATA STORES

BACKGROUND

Data stores may rely upon consistency mechanisms to ensure that data is maintained so that when the data is accessed, the different accesses of the data are made privy to consistent versions of the data. Log-based consistency mechanisms guarantee consistent data by providing a description of changes made to the data and identifying the order in which the changes are to be applied. In this way any access to the data can be serviced from a consistent version of the data determined from the changes described in the log. As storage systems grow in the amount of data stored and the amount of access requests processed, it may be desirable to utilize a log-based consistency mechanism that is best suited to the current demands upon the storage system when servicing requests to access data. However, many different implementations of log-based consistency mechanisms may be utilized and therefore the optimal log-based consistency mechanism is not always ascertainable when initially configuring the storage system to host data. Migrating from one log-based consistency mechanism to another may allow for storage systems to adapt to changing conditions.

Figure 1:
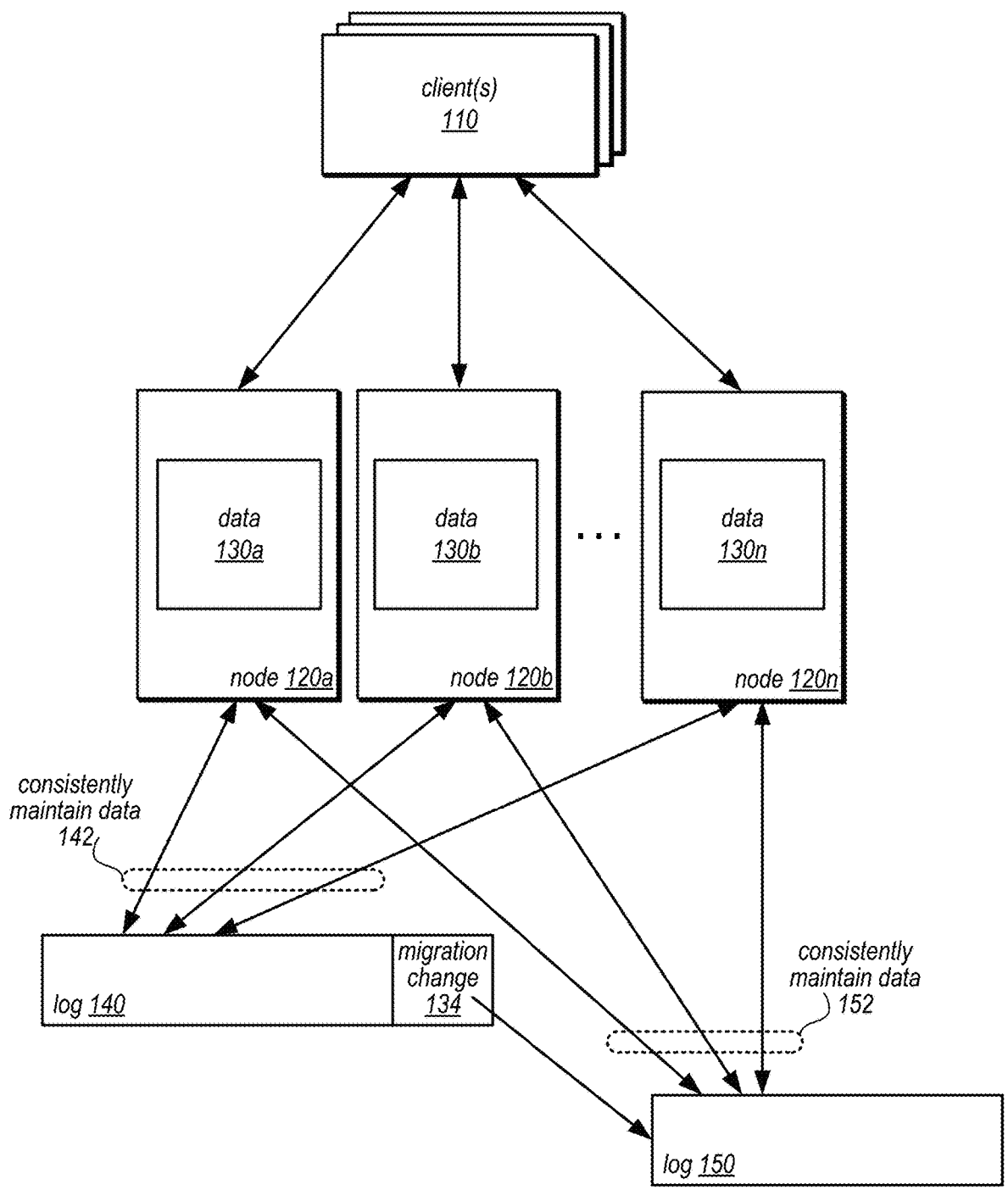
FIG. 1 is a logical block diagram illustrating live migration of log-based consistency mechanisms for data stores, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a computer system may be configured to perform operations even when the operations are not currently being performed). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f), interpretation for that component.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Various embodiments of live migration of log-based consistency mechanisms for data stores are described herein. A common system architecture may consistently maintain state by accepting modifications to the state according to the in-order application of transitions recorded (either implicitly or explicitly) in a log. Whether the system is a single node or multiple node system, the contents of the log describing the transitions or changes may allow the node(s) to agree upon how the state changes over time. Many different consistency mechanisms may be utilized to implement the log. For example, a consensus protocol such as Paxos may be utilized to obtain upon agreement upon whether a new change to state is to be committed to the log, whereas dynamic chaining techniques may be utilized to chain together changes in the log in way that prevents conflicting changes from being committed to the log. Because many different log-based consistency mechanisms may be utilized, the performance characteristics and/or costs of these different log-based consistency mechanisms may create scenarios where an optimal consistency mechanism for maintaining state may change over time. Live migration of log-based consistency mechanisms may be implemented so that nodes maintaining the state may be able to change from one instance of the log to another instance of the log in order to utilize a more optimal log-based consistency mechanism. Moreover, because the migration occurs while the state is still available for access (and thus is still "live") the two different instances of the log may not require a period of synchronization to replicate changes committed at one or the other instance of the log, which could prevent potential data loss or consistency degradation.

FIG. 1 is a logical block diagram illustrating live migration of log-based consistency mechanisms for data stores, according to some embodiments. Replicas of state or data may be maintained in multiple nodes for servicing access requests directed to the data. In FIG. 1, a group of nodes 120a, 120b, and 120n maintain the respective replicas of data 130a, 130b, and 130n in order to provide client(s) 110 with access to the data. For example, data 130 may be a lock table, session data, or some other form of data that needs to be consistently replicated across multiple nodes. In order to maintain data 130 consistently, nodes 120 may rely upon log 140. Log 140 may describe changes that have been applied to data 130 in the order in which they have been applied (e.g., according to a logical time ordering). For example, when a node 120 receives a request to change data 130 from client 110, node 120 may submit the change to log 140. If the change is committed to log 140, then nodes 120 may apply the change as described in log 140 in order to consistently maintain data 142.

In various embodiments, live migration may be performed to switch from the instance of the log 140 to instance of the log 150. Log instance 150 may be implemented using a different consistency implementation type or mechanism and may provide more optimal performance for maintaining data 130 (e.g., higher throughput or lower cost). In order to initiate the migration, a migration change 134 may be committed to log instance 140 according to the same commitment technique for committing any other change to log instance 140. The migration change may identify log instance 150 as describing subsequent changes for data 130. For example, migration change 134 may include an identifier, network address, and or logical sequence number at which subsequent changes may be described in log instance 150. In this way, nodes 120 may apply the changes up to the migration change based on instance of the log instance 140 and then submit and apply changes subsequent to the migration change 134 from instance of the log instance 150, effectively migrating consistent maintenance of data 130 from log instance 140 to log instance 150. Moreover, because the migration utilizes the same commitment and application technique for discovering the new location of subsequent changes, no synchronization between instance of log instance 140 and log instance 150 has to be performed. The changes in log instance 150 may only need to describe changes after migration.

Please note, FIG. 1 is provided as a logical illustration of live migration of log-based consistency mechanisms for data stores, and is not intended to be limiting as to the physical arrangement, size, or number of components, modules, or devices, implementing a data store or log. For instance, logs may be locally stored at nodes 120 or remotely stored at a separate system or service.

The specification first describes an example of a data store that provides live migration of log-based consistency mechanisms, according to various embodiments. Included in the description of the example data store are various aspects of consistently maintaining data according to a log along with the various interactions between nodes, the logs, and clients. The specification then describes a flowchart of various embodiments of methods for live migration of log-based consistency mechanisms for a data store. Next, the specification describes an example system that may implement the disclosed techniques. Various examples are provided throughout the specification.

Figure 2:
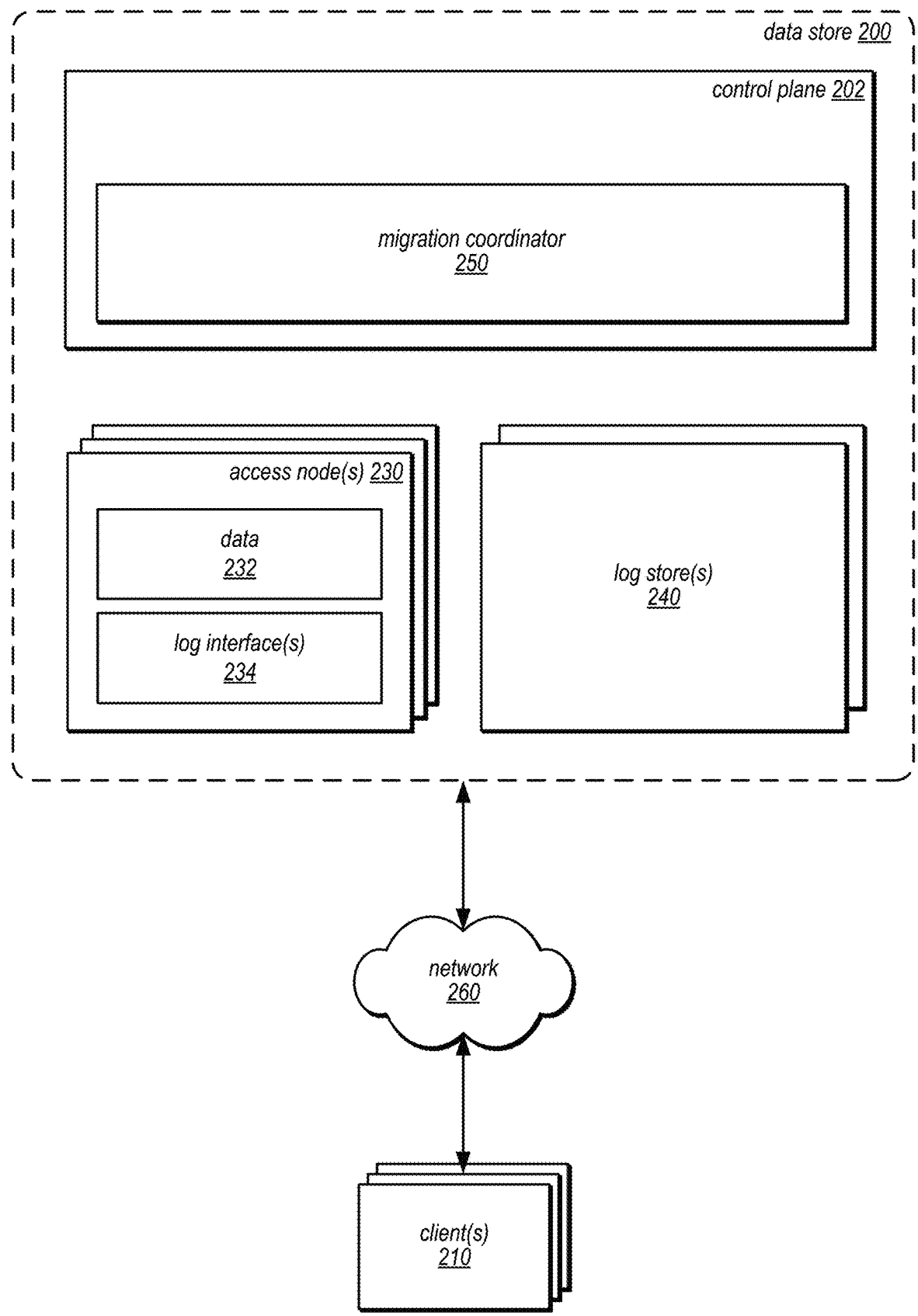
FIG. 2 is a block diagram illustrating a data store that provides live migration from one instance of a log to another instance of a log that is utilized to consistently maintain data for servicing access, according to some embodiments.

FIG. 2 is a block diagram illustrating a data store that provides live migration from one instance of a log to another instance of a log that is utilized to consistently maintain data for servicing access, according to some embodiments. Data store 200 may be private or closed system or may be set up by an entity such as a company or a public sector organization to provide one or more storage services (such as various types of cloud-based storage) accessible via the Internet and/or other networks to clients 210. Data store 200 may be implemented in a single location or may include numerous data centers hosting various resource pools, such as collections of physical and/or virtualized computer servers, storage devices, networking equipment and the like (e.g., computing system 1000 described below with regard to FIG. 8), needed to implement and distribute the infrastructure and storage services offered by the data store 200. In some embodiments, data store 200 may implemented as part of a larger provider network that provides other computing resources or services, such as a virtual compute service and storage services, such as object storage services, block-based storage services, data warehouse storage service, and/or any other type of network based services (which may include various other types of storage, processing, analysis, communication, event handling, visualization, and security services).

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 8 and described below. In various embodiments, the functionality of a given system or service component (e.g., a component of data store 200) may be implemented by a particular node or may be distributed across several nodes. In some embodiments, a given node may implement the functionality of more than one service system component (e.g., more than one data store component).

Data store 220 may store and manage data on behalf of client(s) 210. In various embodiments, data store 200 may be a distributed data store storing data in multiple different locations, such as multiple access nodes 230. Client(s) 210 of data store 200 may submit requests to read, write, modify, obtain, or otherwise access data maintained in data store 200. For example, data store 200 may provide an interface, such as an application programming interface (API), to submit requests to access data via network 260 to access nodes maintaining the data.

In some embodiments, data store 200 may implement control plane 202. Control plane 202 may implement various control functions to manage access nodes 240 and other components of data store 200 that provide storage for client, such as directing creation and placement of new data on access node(s) 230, storage scaling, heat management, node repair and/or replacement. For example, control plane 202 may provision multiple access node(s) 230 to provide a cluster or replica set for data. To provide heat management, for example, control plane 202 may collect metrics reported by access node(s) 230 to determine whether access node(s) 230 should be added or removed from a replica group. In at least some embodiments, control plane 202 may allocate logs to provide a consistency mechanism for data stored on access node(s) 230 to ensure that replicas of data in a replica group are consistently maintained amongst the group members. For example, control plane 202 may provision resources from log store(s) 240 to implement a log for new data to be stored in data store 200. In addition to handling the placement of new data in data store 202, control plane 202 may implement migration coordinator 250 to direct live migration from one instance of a log to another instance of a log, as discussed below with regard to FIGS. 4-6. For example, migration coordinator 250 may evaluate performance metrics with respect to the instance of the log or the nodes maintaining the replicas of state information, in at least some embodiments, to provide automated migration between log instances. Migration coordinator 250 may also respond to requests for migration received from client(s) 210, operators, or other entities with authority to request a change in log instances for data.

In at least some embodiments, data store 200 may implement one or more log store(s) 240. Log store(s) 240 may provide resources to host respective logs for different sets of data hosted in data store 200 so that changes to the data may be described in the respective log in a manner that ensures durability, consistency and serializability of the changes. For example, log store(s) 240 may provide a fault tolerant, high performance, durable, log publishing service that allows access node(s) 230 to submit changes (e.g., transactions to be applied to data maintained at the access nodes 230) while enforcing strong consistency guarantees and supporting constraints between committed records, to enable features like deduplication, sequencing, and read-write conflict detection. For example, in the various write or migration requests illustrated in FIGS. 3 and 4 below, log store(s) 240 may determine whether or not to commit changes to the data by examining a proposed transaction for conflicts with other committed transactions. Such a feature may provide a fine-grained locking model over the data (e.g., only those portions of the data affected by a conflict between transactions may be locked). Log store(s) 240 may maintain a separate log or chain of log records for each data set, serving as an authoritative definition of the changes to the data over logical time. Transactions may be ordered according to logical sequence numbers, which may be monotonically increasing to reference the state of data at individual points in logical time. Note that in some embodiments, log stores(s) 2450 may be a separate system or network-based service implemented as part of provider network that also implements data store 200. In some embodiments, different log store(s) 240 may utilize different implementation types or mechanisms for logs, such as a consensus protocol, a commit protocol, dynamic chain replication, dynamic acyclical graph replication, or a single server, node, system or device maintaining the log). In addition to or instead of log store(s) 240 that store a log remote or separate from the data at access node(s) 230, the log may be maintained at access node(s) 230, in some embodiments.

Data store 200 may implement access node(s) 230 to maintain and handle access to data stored in data store 200. Access node(s) 230 may implement a request handler or other component (not illustrated) to process access requests to data 232 maintained at one or more replicas at different access node(s) 230 that together implement a cluster or replica group for the data. For example, the request handler may implement and/or interpret client requests formatted according to an API for data store 200 and process the identified access requests accordingly, such as discussed below with regard to FIGS. 3, 4, 5, and 7. Access nodes(s) may include one or more storage devices to maintain a replica of data 232. For example, in some embodiments, data 232 may be maintained in non-volatile storage components, such as block-based storage devices, including hard disk drives or solid state drives, or memory components that preserve data, including battery backed ram or NVRAM, without power. In some embodiments, data 232 may be maintained or stored in a volatile memory component, such as SRAM or DRAM, for quick access, or data 232 may be maintained in various combinations of volatile and non-volatile storage.

In various embodiments, access node(s) 230 may implement log interface(s) 234 in order to interact with the instances of the log for consistently maintaining the data. For example, log interface(s) 234 may provide capabilities to interact with (e.g., validate changes) with respect to the logs corresponding to data 232 stored in log store(s) 240, according to the various techniques discussed below with regard to FIGS. 3, 4, 5, and 7. A request to submit a change may be formatted according to an API for log store(s) 240 to request that the change be committed, in some embodiments. Log interface(s) 234 may also include the capability to submit or obtain changes from an instance of a log that is locally maintained among access node(s) 230 of a replica group for data 232. For example, log interface(s) 234 may be configured to implement a consensus protocol, such as Paxos, to obtain consensus for submitting the change to the log.

Generally speaking, clients 210 may encompass any type of client configurable to submit network-based requests to data store 200 via network 260, including requests for storage services (e.g., a request to create, read, write, obtain, or modify data in data store 200, etc.). For example, a given client 210 may include a suitable version of a web browser, or may include a plug-in module or other type of code module configured to execute as an extension to or within an execution environment provided by a web browser. Alternatively, a client 210 may encompass an application such as a database application (or user interface thereof), a media application, an office application or any other application that may make use of storage resources in data store 200 to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 210 may be an application configured to interact directly with data store 200. In some embodiments, client 210 may be configured to generate network-based services requests according to a Representational State Transfer (REST)-style network-based services architecture, a document- or message-based network-based services architecture, or another suitable network-based services architecture.

In some embodiments, a client 210 may be configured to provide access to data store 200 to other applications in a manner that is transparent to those applications. For example, client 210 may be configured to integrate with an operating system or file system to provide. However, the operating system or file system may present a different storage interface to applications, such as a conventional file system hierarchy of files, directories and/or folders. In such an embodiment, applications may not need to be modified to make use of the storage system service model. Instead, the details of interfacing to data store 200 may be coordinated by client 210 and the operating system or file system on behalf of applications executing within the operating system environment.

Clients 210 may convey network-based services requests (e.g., access requests directed to data in data store 200) to and receive responses from data store 200 via network 260. In various embodiments, network 260 may encompass any suitable combination of networking hardware and protocols necessary to establish network-based-based communications between clients 210 and data store 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 210 and data store 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 210 and the Internet as well as between the Internet and data store 200. It is noted that in some embodiments, clients 210 may communicate with data store 200 using a private network rather than the public Internet.

Figure 3:
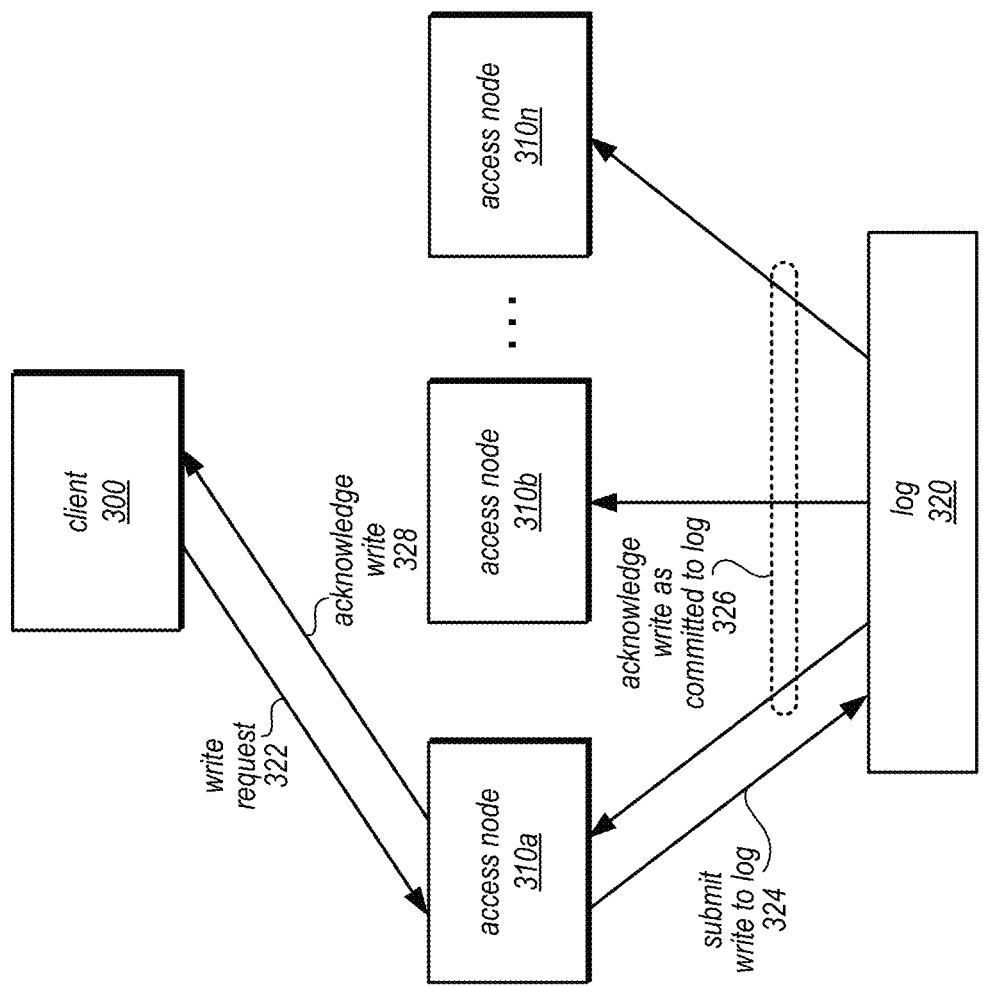
FIG. 3 is a block diagram illustrating the servicing of a write request to change data that is consistently maintained according to log, according to some embodiments.

Access nodes may service access requests for data maintained in data store 200. Read requests may be processed at access nodes by accessing the replica of the data maintained at the access node. For processing write requests, access nodes may utilize the instance of the log to ensure that changes to data performed as part of a write request are processed in such a way as to guarantee durability, consistency and serializability of changes that are committed to the log so that any access node maintaining a replica of the data will maintain the same version of the state information described by the changes committed to the log (even in scenarios where access nodes enter or leave the group of access nodes maintaining the data). FIG. 3 is a block diagram illustrating servicing a write request to change data that is consistently maintained according to log, according to some embodiments.

Client 300 may send a write request 322 directed to the data to one of the access nodes maintaining a replica of the data, like access node 310 as illustrated in FIG. 3. Access node 310 then processing and send a request to submit the write 324 to log 320. Depending on the implementation type or mechanism for adding new changes to log 320, access node 310 may send a request to a remote log store or to other access nodes maintaining the replicas of the data, which also maintain the log of changes to the data. If the submitted write is committed to log 320, then as illustrated in FIG. 3 an acknowledgment of the write as committed to log 320 may be provided to access nodes 310. In some embodiments, access nodes 310 may periodically request new committed changes, while in other embodiments, acknowledgements of committed changes including the change describing write request 324 may be pushed or provided to the access nodes 310 automatically. Once received the access nodes 310 may update the replicas of the data maintained at the access nodes to include or apply the change identified by the write request. In at least some embodiments, an acknowledgement of the write request 328 may be sent to client 300.

Figure 4:
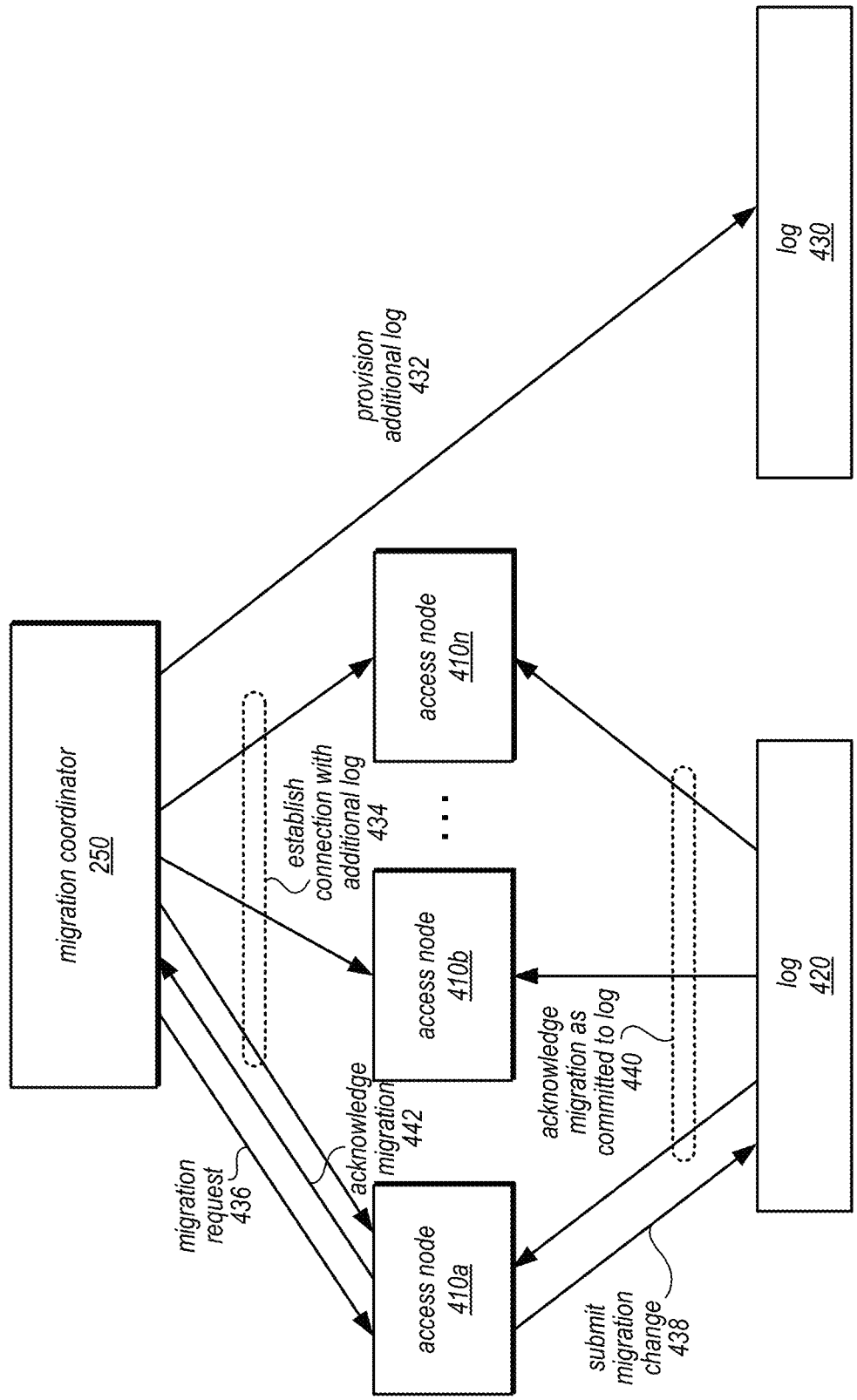
FIG. 4 is a block diagram illustrating a migration coordinator that performs a live migration from one instance of a log to another instance of a log that provides for consistent maintenance of data, according to some embodiments.

Similar to the consistent maintenance techniques discussed above, live migration of log-based consistency mechanisms may utilize techniques to submit a migration change to an instance of a log that is currently used to consistently maintain data at access nodes. FIG. 4 is a block diagram illustrating a migration coordinator that performs a live migration from one instance of a log to another instance of a log that provides for consistent maintenance of data, according to some embodiments. Migration coordinator 250, as noted above may determine when to perform a live migration for an instance of a log. In some embodiments, the determination may be performed automatically, for example, based on an evaluation of performance metrics or other information concerning the access nodes, clients, or instance of the log, such as discussed below with regard to FIG. 6. Various criteria, thresholds, or other techniques for determining when to perform migration may be employed with respect to these performance metrics and when satisfied trigger a live migration event. In some embodiments, migration coordinator 250 may initiate performance of a live migration event in response to a request from a client, operator, or other entity with access to the data store.

Migration coordinator 250 may provision 432 the additional log instance 430. For example, migration coordinator may send a request to a log store, or other system or service that is configured to host a log in order to allocate a log instance for describing changes to the data subsequent to the migration. Once provisioned, migration coordinator 250 may also provide instructions to access nodes 410a, 410b, and 410n to establish a connection with the instance of the log 430. In this way, access nodes 410 may immediately begin to utilize the log upon competition of the migration via the previously established connections (e.g., without having to wait to exchange various identification and connection messages). Although not illustrated in FIG. 4, migration coordinator 250 may provide similar instructions or notification to a system, components, or devices implementing log instance 420 to prepare for migration to log 430. In this way, log 420 can perform various operations like, identifying a location within log 430 (e.g., a particular LSN) at which new changes may be described.

Migration coordinator 250 may then send a migration request 436 to one of the access nodes 410 (while the request is illustrated as being sent to access node 410a, any of the nodes maintaining a replica could receive and process the migration request and thus illustration is not intended to be limiting). Access node 410 may process the migration request as a change or write to the data (e.g., changing operational data that identifies log 420 for consistently maintaining the data) and submit a migration change 438 to log 420 to be committed (e.g., like a write request submitted for committal to the log as discussed below with regard to FIG. 7). For example, access node 410a may generate a message or request, including any data or information to represent the migration change (e.g., by generating a log record for inclusion in log 420), such as by including an identifier, location (e.g., network address) and/or other information to access log 430 for processing subsequent changes to the data. In some embodiments, access node 410a may determine a starting location within log instance 430 (e.g., a logical sequence number, slot identifier, etc.) to be included with the migration change described in log 420. If the migration change is committed according the consistency mechanism implemented for log 420 (e.g., a consensus protocol or commit protocol, such as Paxos, Raft, Zookeeper Atomic Broadcast (ZAB), viewstamped replication, two phase commit, dynamic chain replication, dynamic acyclical graph replication, or a particular infrastructure that provides consistency, such as a single server, node, system or device maintaining the log), then the migration may be acknowledged 440 as committed to log 420 to access nodes 410. In some embodiments, access nodes 410 may periodically request new committed changes, while in other embodiments, acknowledgements of committed changes including the migration change 440 may be pushed or provided to the access nodes 410 automatically. In some embodiments, access node 410a may acknowledge the migration request as committed 442 to migration coordinator 250. In this way, migration coordinator can track the progress of the live migration, determine whether the migration completed successfully, or trigger recovery or roll-back operations in the event of a failure of the migration. While the migration change is being directed by migration coordinator, access nodes 410 may continue to receive and process access requests directed to the data, as discussed above with regard to FIG. 3 and below with regard to FIGS. 6 and 7.

Figure 5:
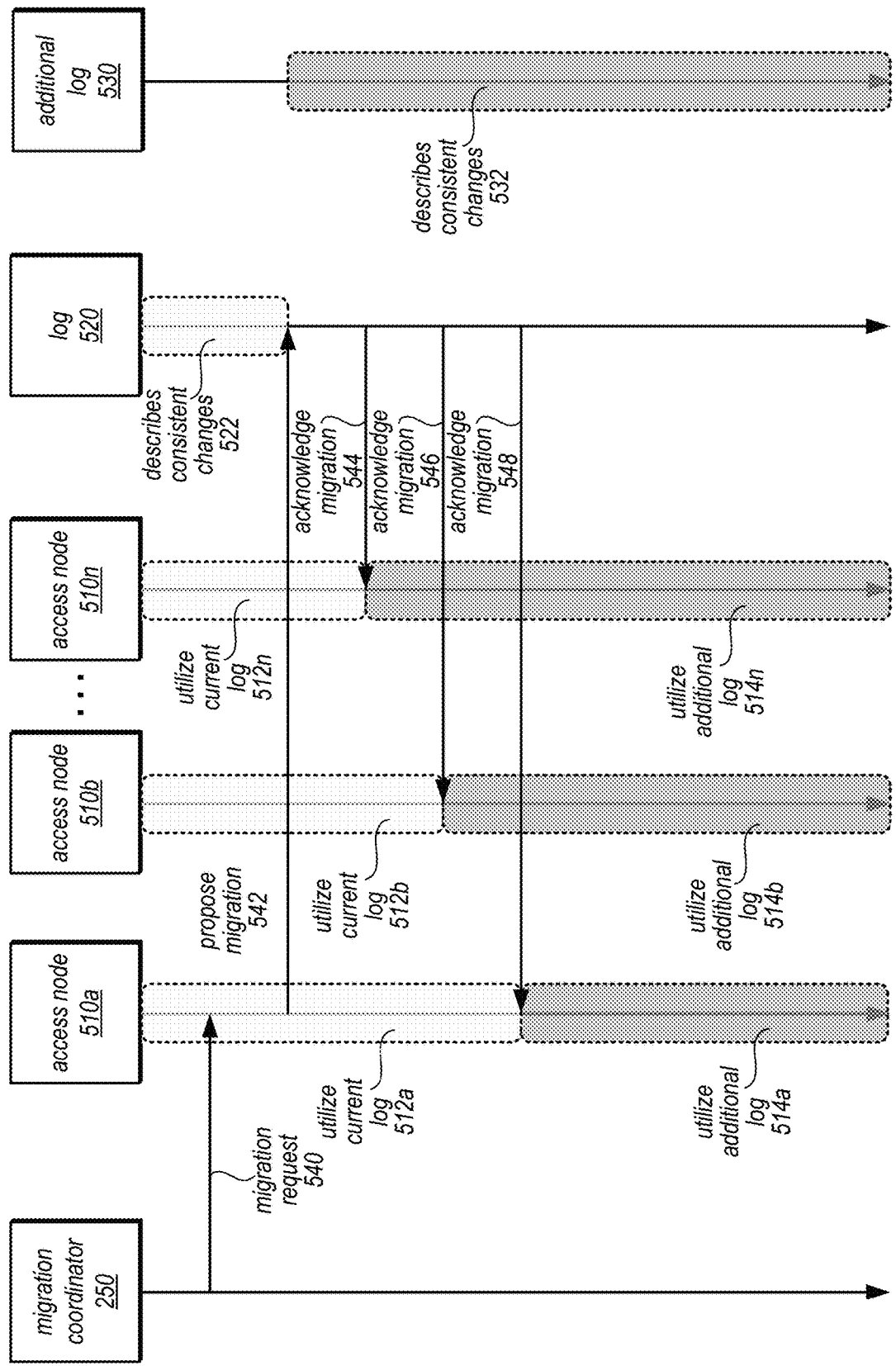
FIG. 5 is a sequence diagram illustrating a live migration from one instance of a log to another instance of a log that provides for consistent maintenance of data, according to some embodiments.

FIG. 5 is a sequence diagram illustrating a live migration from one instance of a log to another instance of a log that provides for consistent maintenance of data, according to some embodiments. When migration coordinator 250 sends a migration request 540 to access node 510a, access node 510a still utilizes 152 current log 520 to maintain a replica of data at node 510a. Access node 510a proposes the migration 542 to log 520. Once committed at log 520, log 520 will describe consistent changes 152 for the data until the committed change indicating the migration after which any subsequent changes submitted to log 520 (e.g., performed by access nodes 510a, 510b, or 510n prior to receiving the acknowledgement of the migration, acknowledgments 544, 546, and 548) may be rejected (or if committed ignored by access nodes 510 as the access nodes will apply changes to the data according to the logical ordering of changes in the log so that once the migration change is applied, no further changes from log 520 will be applied). Acknowledgment or application of the committed migration may be eventually applied to the access nodes (e.g., acknowledgments 544, 546, and 548 respectively) after which the access nodes may switch from utilizing current log 520 (as indicated at 512a, 512b and 512n) to utilize the additional log 530 for consistently maintaining the data (as indicated at 514a, 514b, and 514n). Additional log 530 may begin describing consistent changes 532 subsequent to the commitment of the migration in log 520. In this way, only one instance of the log is authoritative for consistently maintaining the data at any given point in time. Change requests committed to an instance of the log at a time (e.g., as indicated by a log sequence number) when the log does not describe changes to the data may be ignored by access nodes (changes at log 520 outside of time period 522 or changes at additional log 530 outside of time period 532).

Figure 6:
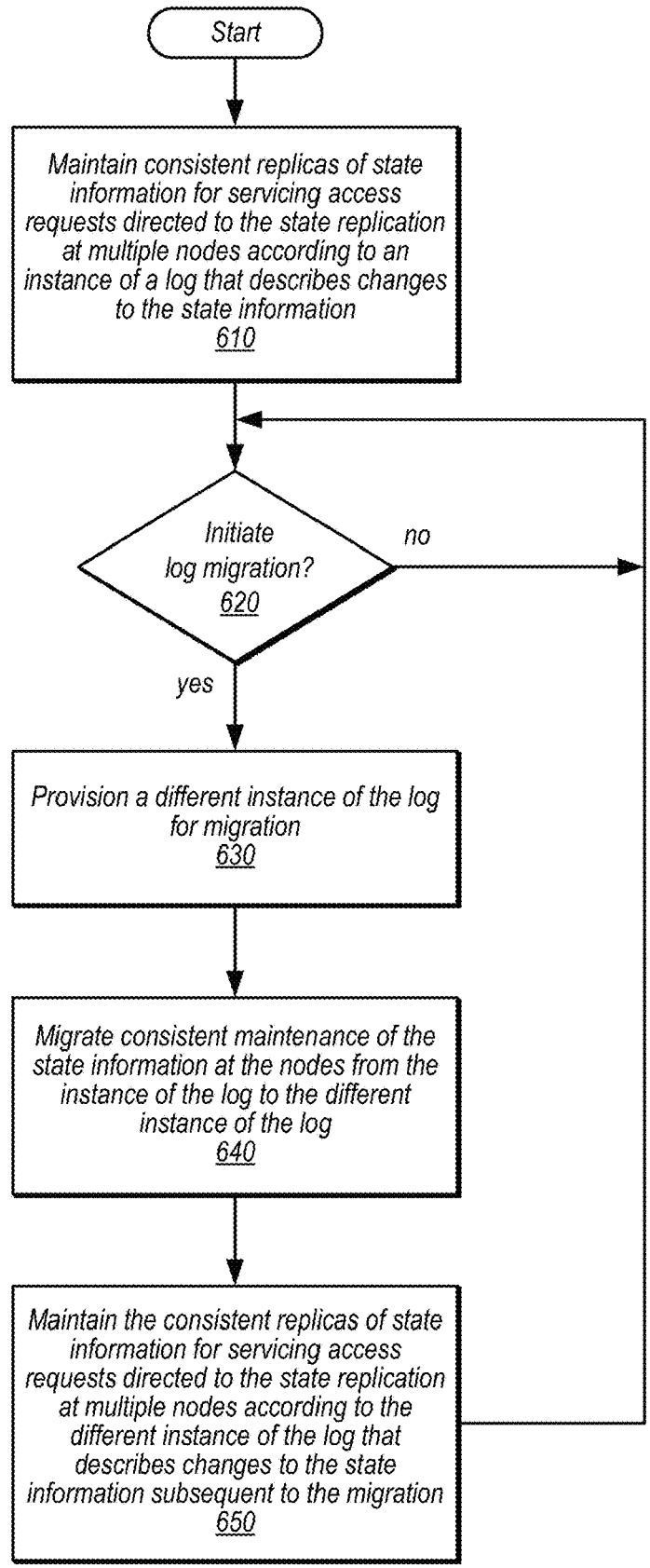
FIG. 6 is a high-level flowchart illustrating methods and techniques to implement live migration of log-based consistency mechanisms for data stores, according to some embodiments.

The data storage service, including the access nodes, log stores, and migration coordinator implementing live migration for log-based consistency mechanisms for data stores and other techniques discussed in FIGS. 2 through 5 provide examples of a data store consistently maintaining data according to log and migrating from one instance of the log to another while continuously processing access requests to the data to continue. However, various other types of data stores, such as other types of distributed storage systems may implement live migration for log-based consistency mechanisms. FIG. 6 is a high-level flowchart illustrating methods and techniques to implement live migration of log-based consistency mechanisms for data stores, according to some embodiments. Various different distributed data stores including the embodiments described above may implement the techniques described below.

As indicated at 610, replicas of state information may be consistently maintained at multiples nodes. State information may include any form of data, such as tables, files, or other data objects. State information may include client data maintained in the data store on behalf of a client. For example, the state information may be a lock table that identifies which clients of the state hold an exclusive right to perform certain operations. In addition to client data, state information may also include information maintained on behalf of the data store. For example, state information may include the identities or locations (e.g., network addresses) of other nodes in a cluster of nodes that maintain replicas of the same state information, the identity of a log describing changes to the state information (e.g., name, identifier, and/or network address), configuration information for the data store (e.g., replication factor for the state information, length of time in which past changes are preserved in the log before archival and/or deletion), or any other information for operating the data store. State information may be maintained in non-volatile storage components, such as block-based storage devices, including hard disk drives or solid state drives, or memory components that preserve data, including battery backed ram or NVRAM. In some embodiments, state information may be maintained or stored in a volatile memory component, such as SRAM or DRAM, for quick access, or state information may be maintained in various combinations of volatile and non-volatile storage.

Consistent maintenance of the replicas of state information across the multiple nodes may be obtained by utilizing the instance of the log that describes the changes to the state information. An instance of a log may be a particular portion and/or implementation of the log. Changes may be maintained as log records with assigned log sequence numbers or other logical sequence indicators or may be maintained in individual slots ordered according to logical sequence. By applying the changes in the instance of the log according to the logical sequence (e.g., a time-ordered sequence) the state information at any point in the logical sequence may be determined and/or made accessible via the replicas of state information at the nodes.

As discussed above with regard to FIGS. 1, 3, and 4, the instance of the log may be implemented in different ways. For example, some instances of the log may be implemented locally at the nodes in addition to the state information. A consensus protocol, such as the Paxos protocol, or commit protocol, such as the two-phase commit protocol, may be implemented to ensure that changes to the state information are consistently replicated across the nodes. In at least some embodiments, committing changes to the log may be performed in such a way as to guarantee durability, consistency and serializability of changes that are committed to the log so that any node maintaining a replica of the state information will maintain the same version of the state information described by the changes committed to the log. In some embodiments, the log may be remotely stored at separate nodes, systems, servers or devices. For example, a single server or node may maintain the log so that all proposed changes to the state information are committed or rejected by the single server or node. In some embodiments, a remotely stored log may be implemented across multiple nodes. For example, in a dynamic chain replication implementation, changes to the state information may be chained together on one or multiple nodes. Similarly, creating directed acyclical graphs of nodes (instead of chains) maintaining the changes to state information may be used to identify valid paths among the nodes maintaining the changes to implement the log. Like the local implementations of the instance of the log discussed above, remotely stored logs may be implemented in such a way as to guarantee durability, consistency and serializability of changes that are committed to the log.

Different implementations of the instance of the log may provide different performance characteristics and/or incur different costs. For example, instances of the log implemented via a Paxos protocol may have lower speed or throughput capacity for processing new changes to add to the log when compared with a remotely stored log implementation, such as a dynamic chain or directed acyclical graph replication technique. However, the cost in terms of resources to implement the separate remote log store may be greater than the local log implementation. Therefore, the decision to migrate between instances of logs may leverage an optimization provided by changing the log instance implementation. In some scenarios, migration decisions may also be made to change the underlying hardware or resources implementing the instance of the log, without changing the type or mechanism by which the log ensures durability, consistency and serializability of changes that are committed to the log (e.g., a Paxos protocol, a two phase commit protocol, dynamic chain replication, dynamic acyclical graph replication, or other consensus or commit protocol, or a system architecture or structure that provides consistency, such as a single server, node, system or device maintaining the log). Consider one example, where a single server maintaining the instance of the log for the state information at the nodes starts to suffer from poor performance. Instead of changing to a different implementation type, the log may be migrated to another server which singly maintains the log. Thus live migration can occur between implementation types and/or the computing or other hardware resources implementing the different instances of the log.

As indicated at 620, a determination of whether log migration is to be performed may be made, in various embodiments. A monitoring component (e.g., implemented as part of a control plane or migration coordinator, like migration coordinator 250 in FIG. 2) may evaluate performance metrics with respect to the instance of the log or the nodes maintaining the replicas of state information, in at least some embodiments, to provide automated migration between log instances (e.g., as indicated by the negative exit 620 looping back to 620). For instance, the latency for proposing new changes to the instance of the log may be tracked and a migration event may be triggered if the latency falls above or below a certain threshold. Similarly, the frequency of access requests, or certain types of access requests, such as write requests, may be tracked and evaluated with respect to a threshold. Depending on the triggered migration event or threshold, a different of implementation type or mechanism may be determined (e.g., a type that provides lower latency for processing proposed changes or for handling higher/lower frequency of access requests) or different resources implementing the log may be selected (e.g., a new server or set of servers). In at least some embodiments, log migration may be initiated in response to a request to the data store (e.g., submitted via a programmatic interface (API) or via a graphical user interface (GUI) implemented as part of a website or control application). The request may specify the different instance to utilize (e.g., different implementation type or resources) or may allow for the different instance to be chose automatically based on considerations similar to those discussed above (e.g., comparing performance metrics with known behaviors of different implementation types or resources).

As indicated at 630, a different instance of the log may be provisioned for migration. For example, a request may be submitted to a remote log store or other system specifying or requesting a new log structure by be allocated for maintaining changes to the state information subsequent to the migration. In some embodiments, various hardware resources may be identified, configured, or otherwise prepared for implementing the different instance of the log. Access credentials, location (e.g., network address), identifiers, and/or any other information to utilize the different instance of the log may be obtained. The nodes may be instructed to load, configure, and/or establish the necessary connections or protocols for interacting with the different instance of the log so that if the migration is successful, utilization of the different instance may begin immediately.

As indicated at 640, consistent maintenance of the state information at the nodes may be migrated from the instance of the log to the different instance of the log, in various embodiments. The migration may be performed while the nodes continue to accept and process access requests (e.g., read or write requests) to the state information. For example, as discussed above with regard to FIG. 1, a migration change to the instance of the log may be committed to the instance of the log. The migration change may indicate that changes subsequent to the migration event may be found in the different instance of the log. In at least some embodiments, the change may identify a particular logical sequence number, slot number, or other location within a logical ordering for the different instance of the log from which subsequent changes to the state information may be maintained. In this way, the change describing the migration may be consistently shared and applied at all of the nodes at the same point in the ordering of changes to the state information. Depending on the consistency mechanism for the instance of the log, the migration change may be shared with the nodes (e.g., as discussed above with regard to FIGS. 3-5).

As indicated at 650, upon completion of the migration, the consistent replicas of the state information may be maintained at the nodes for servicing access requests according to the different instance of the log that describes changes to the state information subsequent to the migration. If, for instance, a different implementation type is utilized for the different instance of the log, then the appropriate actions for reading and/or writing changes to the different instance of the log may be performed (e.g., performing the different actions to implement the consensus protocol, the commit protocol, the dynamic chain replication, the dynamic acyclical graph replication, or the single server, node, system or device maintaining the different instance of the log). If the different instance of the log is implemented using the same implementation type, but different resources (e.g., different servers or nodes), then the appropriate read/write actions may be performed with respect to the different resources.

The techniques described in FIG. 6, may be performed multiple times, migrating from one instance of the log to another when appropriate. In some embodiments, roll-back operations may be performed to change back from a different instance of the log to the original instance (which may then describes changes up to the first migration event and changes after the roll-back event). Changes in implementation type for the instance of the log may result in other changes to the operation of the nodes. For example, a consensus protocol, such as Paxos, may rely upon a knowledge of the identity of nodes in a cluster of nodes (for determining the consensus on proposed changes). In order to obtain the identity of the nodes in the cluster, a gossip protocol may be implemented between the nodes to determine current cluster membership, health, or other information for performing the consensus protocol. If the different instance for the log has a different implementation technique (e.g., dynamic chain replication implementation type implemented at a separate store1), it may be that the information shared in the gossip protocol can be communicated via changes to the log itself (as the dynamic chain replication implementation type may be able to handle a higher number of changes at a greater throughput). So in addition to maintaining the consistent replicas via the different instance of the log, the nodes may also be reconfigured to pass gossip information to other nodes in the cluster by submitting the gossip information as changes to the different instance of the log.

Figure 7:
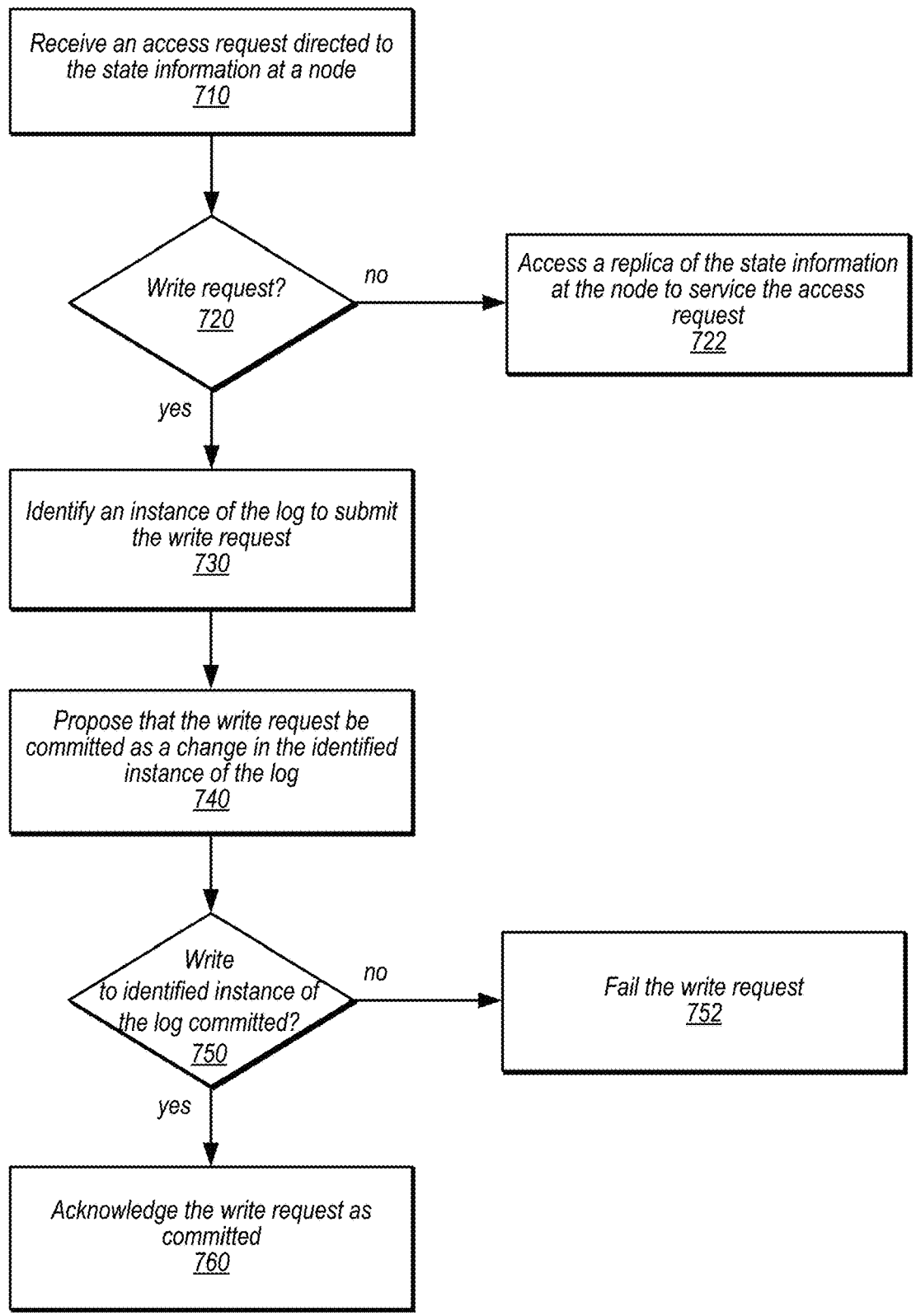
FIG. 7 is a high-level flowchart illustrating methods and techniques to process an access request at a node consistently maintaining a replica of state information according to an instance of a log, according to some embodiments.

Implementing live migration for log-based consistency mechanisms for data stores may result in multiple instances of a log describing different changes. When processing access requests, nodes may need to be aware of the migration so that the appropriate instance of the log is utilized when processing certain access requests (e.g., write requests). FIG. 7 is a high-level flowchart illustrating methods and techniques to process an access request at a node consistently maintaining a replica of state information according to an instance of a log, according to some embodiments.

As indicated at 710, an access request directed to state information may be received at a node. The access request may be formatted according to a programmatic interface (API) and may identify the particular data which is to be accessed or new data which is to be added. The access request may specify whether the access request is a read or write request. If not a write request, as indicated by the negative exit from 720, then the replica of the state information maintained at the node may be accessed in order to service the access request, as indicated at 722. For example, the particular data identified in the request may be read from the storage device maintaining the replica of the state information and returned to the requesting client.

As indicated by the positive exit from 720, if the access request is a write request, then an instance of the log to submit the write request may be identified, as indicated at 730 (in order to sure that the correct instance of the log is used for submitting the write request). For example, the node may maintain as part of the state information the location of the instance of the log currently being utilized. Once identified, the node may propose that the write request be committed as a change in the identified instance of the log. Depending on the implementation type of the instance of the log the proposal of the write request may be performed in different ways. If, for example, the instance of the log is implemented utilizing a consensus protocol amongst a group of nodes maintaining replicas of the state information, then the node may send the write request to other nodes in the group of nodes according to the consensus protocol. If a separate log store implements the instance of the log, then the node may send the write request to the separate log store. As indicated at 750, the write request may or may not be committed to the identified instance of the log. If not committed, then the node may fail the write request, as indicated at 752. For example, the node may send an error message or timeout in responding to a client that submitted the write request. However, if the write is committed, then the write request may be acknowledged as committed to the client, as indicated at 760. Note that for nodes who have not yet received an acknowledgement of a migration change (e.g., submitted by another node) may submit a write request to an identified instance of the log that is no longer currently describe changes to the state information. In such cases, a node may not send an acknowledgement as indicated at 760 until all prior committed changes have been applied by the node. If a migration change is detected when applying the prior committed changes, then the write request may be treated as failing to commit (not illustrated).

The methods described herein may in various embodiments be implemented by any combination of hardware and software. For example, in one embodiment, the methods may be implemented by a computer system (e.g., a computer system as in FIG. 8) that includes one or more processors executing program instructions stored on a computer-readable storage medium coupled to the processors. The program instructions may be configured to implement the functionality described herein (e.g., the functionality of various servers and other components that implement the directory storage service and/or storage services/systems described herein). The various methods as illustrated in the figures and described herein represent example embodiments of methods. The order of any method may be changed, and various elements may be added, reordered, combined, omitted, modified, etc.

Figure 8:
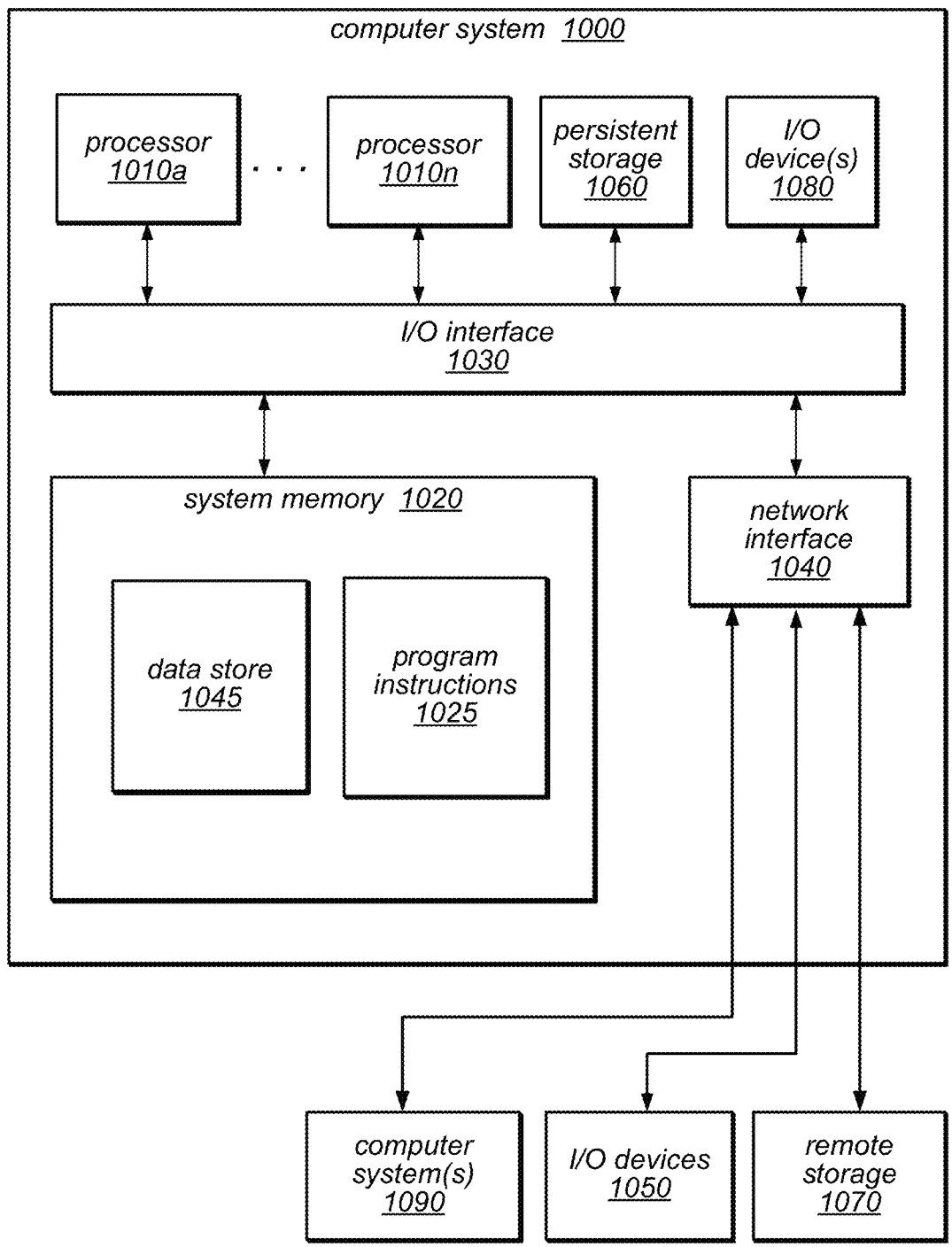
FIG. 8 is an example computer system, according to various embodiments.

FIG. 8 is a block diagram illustrating a computer system configured to implement the data store providing live migration of log-based consistency mechanisms, according to various embodiments, as well as various other systems, components, services or devices described above. For example, computer system 2000 may be configured to implement access nodes, log stores, or other data store components, such as a migration coordinator, for implementing live migration of log-based consistency mechanisms for data stores, in different embodiments. Computer system 2000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.). For example, a client application executing on system 1000 may use network interface 1040 to communicate with a server application executing on a single server or on a cluster of servers that implement one or more of the components of the directory storage systems described herein. In another example, an instance of a server application executing on computer system 1000 may use network interface 1040 to communicate with other instances of the server application (or another server application) that may be implemented on other computer systems (e.g., computer systems 1090).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage system server node, and persistent storage 1060 may include the SSDs attached to that server node.

Computer system 1000 includes one or more system memories 1020 that are configured to store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the functionality of a access nodes that maintain v data or components of a log store that maintain logs describing changes to the data, in different embodiments. In some embodiments, program instructions 1025 may implement multiple separate clients, server nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/DIRECTORY STORAGE SERVICE 220-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. For example, the information described herein as being stored by the hierarchy storage nodes or log store described herein may be stored in data store 1045 or in another portion of system memory 1020 on one or more nodes, in persistent storage 1060, and/or on one or more remote storage devices 1070, at different times and in various embodiments. In general, system memory 1020 (e.g., data store 1045 within system memory 1020), persistent storage 1060, and/or remote storage 1070 may store data blocks, replicas of data blocks, metadata associated with data blocks and/or their state, database configuration information, and/or any other information usable in implementing the methods and techniques described herein.

In one embodiment, I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems 1090 (which may implement embodiments described herein), for example. In addition, network interface 1040 may be configured to allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 8 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

The various methods as illustrated in the figures and described herein represent example embodiments of methods. The methods may be implemented manually, in software, in hardware, or in a combination thereof. The order of any method may be changed, and various elements may be added, reordered, combined, omitted, modified, etc.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
 a plurality of access nodes, respectively comprising at least one processor and a memory, configured to process access requests to respective replicas of data consistently maintained at the access nodes according to a first instance of a plurality of instances of a log that describes changes to the data;
 wherein one of the access nodes is further configured to submit a change to be committed to the first instance of the log, wherein the submitted change comprises location information identifying a different instance of the plurality of instances of the log for consistently maintaining the data, wherein the first instance of the log comprises the location information identifying the different instance of the log based on committing the submitted change, wherein subsequent changes to the data are described in the different instance of the log, and wherein the change is submitted to the first instance of the log while the access nodes are available for processing access requests; and
 upon a determination at the plurality of access nodes that the change that is committed to the first instance of the log identifies the different instance, the plurality of access nodes is further configured to:
  process one or more additional access requests to the respective replica of the data according to the different instance of the log.

2. The system of claim 1, wherein an implementation type for the first instance of the log is different than another implementation type for the different instance of the log.

3. The system of claim 1,
 prior to the submission of the change to the first instance of the log, the access nodes are configured to establish a network connection with one or more computing resources implementing the different instance of the log.

4. The system of claim 1, further comprising:
 one or more compute nodes respectively comprising at least one processor and a memory that implement a migration coordinator, configured to:
  detect a migration event for log; and
  in response to the detection of the migration event, send a request to the one access node to submit the change to the first instance of the log.

5. A method, comprising:
 performing, by one or more computing devices:
  maintaining consistent replicas of state information for servicing access requests directed to the state information at a plurality of nodes according to an instance of a log that describes changes to the state information; and
  while the plurality of nodes are available for servicing access requests directed to the state information, migrating consistent maintenance of the state information at the plurality of nodes from the instance of the log to a different instance of the log, wherein the instance of the log comprises location information identifying the different instance of the log responsive to migrating the consistent maintenance of the state information, and wherein subsequent changes to the state information are described in the different instance of the log.

6. The method of claim 5, wherein migrating the consistent maintenance of the state information at the plurality of nodes from the instance of the log to the different instance of the log comprises committing a change to the instance of the log, wherein the change comprises the location information for the different instance of the log for describing the subsequent changes to the state information.

7. The method of claim 6,
wherein committing the change to the instance of the log comprises sending, by one of the nodes, a request to commit the change to the instance of the log;
wherein the method further comprises:
obtaining, by the nodes, the change from the instance of the log; and
applying, at the nodes, the change to the state information to identify the different instance of the log for consistent maintenance of the state information.

8. The method of claim 5, wherein the instance of the log and the different instance of the log are implemented according to different ones of a plurality of implementation types for the log, comprising:
a consensus protocol;
a two-phase commit protocol;
a dynamic chain replication technique;
a dynamic acyclical graph replication technique; or
a single node.

9. The method of claim 5, wherein one of the instance of the log or the different instance of the log is implemented at the nodes, and wherein the other one of the instance of the log or the different instance of the log is implemented remote from the nodes.

10. The method of claim 5, wherein implementation of the instance of the log comprises performing gossip-based communications among the nodes, and wherein migrating the consistent maintenance of the state information at the plurality of nodes from the instance of the log to the different instance of the log comprises:
halting gossip-based communications among the nodes; and
submitting the gossip-based communications as changes to the different instance of the log to be obtained from the different instance of the log by the nodes.

11. The method of claim 5, further comprising:
detecting a migration event for the log; and
in response to detecting the migration event, performing the migrating of the consistent maintenance of the state information at the plurality of nodes from the instance of the log to the different instance of the log.

12. The method of claim 5, further comprising:
migrating consistent maintenance of the state information at the plurality of nodes from the different instance of the log to another instance of the log, wherein subsequent changes to the state information upon completion of the migration to the other instance of the log are described in the other instance of the log.

13. The method of claim 5, further comprising:
prior to migrating the consistent maintenance of the state information at the plurality of nodes from the different instance of the log to another instance of the log, establishing a network connection between the nodes and one or more resources implementing the different instance of the log.

14. A non-transitory, computer-readable storage medium, storing program instructions that when executed by one or more computing devices cause the one or more computing devices to implement:
processing one or more access requests received from one or more clients to data that is consistently maintained at a plurality of nodes according to an instance of a log that describes changes to the data; and
while processing the one or more access requests, committing a change to the instance of the log, wherein the change comprises location information identifying a different instance of the log for consistently maintaining the data, wherein the instance of the log comprises the location information responsive to the change, and wherein subsequent changes to the data are described in the different instance of the log, and wherein at least one of the access requests to the data is processed based on the different instance of the log.

15. The non-transitory, computer-readable storage medium of claim 14, wherein the program instructions cause the one or more computing devices to further implement provisioning one or more computing resources to implement the different instance of the log.

16. The non-transitory, computer-readable storage medium of claim 14, wherein a consistency mechanism for the instance of the log is different than another consistency mechanism for the different instance of the log.

17. The non-transitory, computer-readable storage medium of claim 14, wherein the committing the change to the instance of the log that identifies the different instance of the log for consistently maintaining the data is performed as part of a roll-back operation, wherein the different instance of the log is a previously utilized instance of the log for consistently maintaining the data.

18. The non-transitory, computer-readable storage medium of claim 14, wherein a consistency mechanism for the instance of the log is the same as a consistency mechanism for the different instance of the log, wherein the different instance of the log is implemented on one or more computing resources different than those computing resources implementing the instance of the log.

19. The non-transitory, computer-readable storage medium of claim 14, wherein the program instructions cause the one or more computing devices to further implement:
prior to committing the change to the instance of the log:
evaluating one or more performance metrics for the nodes or the instance of the log to determine an implementation type for the different instance of the log, wherein the implementation type for the different instance of the log is different than an implementation type for the instance of the log.

20. The non-transitory, computer-readable storage medium of claim 14, wherein the program instructions cause the one or more computing devices to further implement:
detecting a migration event for the log; and
in response to detecting the migration event, performing the committing of the change to the instance of the log.

* * * * *